UNITED STATES PATENT OFFICE.

JAMES P. CROSS, OF WATERTOWN, NEW YORK.

IMPROVED BURNING-FLUID.

Specification forming part of Letters Patent No. 57,095, dated August 14, 1866.

*To all whom it may concern:*

Be it known that I, JAMES P. CROSS, of Watertown, in the county of Jefferson and State of New York, have invented a new and useful Burning-Fluid or Illuminating-Oil; and I do hereby declare the following to be a full, clear, and exact description of the same.

My invention has for its object the production of an illuminating-oil or burning-fluid which can be used in all ordinary lamps, with or without a chimney, and give a light of great brilliancy at far less expense than has been heretofore done; and it consists in the combination of certain ingredients, each having certain necessary chemical properties therefor, as will be hereinafter more fully described.

The fluid is composed of gasoline, gum-olibanum, lichen, cascarilla-bark.

I employ gasoline of 70° or 71° gravity as a base. It is most important that this should be used. Its illuminating properties are very good. There is but a tax of five per cent. *ad valorem* on it above 70°, while on benzine and others it is twenty cents per gallon; hence I can make a cheaper illuminating-oil, besides one of brilliancy and safety. I then add the cascarilla-bark. This assists in giving a body and relieves the unpleasant odor or smell. The gum-olibanum is next added. The properties of this gum render it a very valuable adjunct in my preparation. It is highly inflammable but non-explosive, and is particularly adapted for giving a soft and mellow light. It emits a light and pleasant odor when burning, and also relieves the unpleasant smell of the oil. It is an article of much value, yet can be purchased for but a small sum, and from long and continued experiments I find that it is the most important and useful gum that could possibly be employed for this purpose. I know that gum-camphor possesses some of these properties, but not so much so by seventy-five per cent., while its cost is at least sixty-six per cent. greater.

I add a small quantity of lichen. This has a tendency to retard evaporation of the compound, thus making it last much longer. It possesses strong mucilaginous qualities, and gives the body to the compound.

The proportion I use is as follows: Forty gallons of gasoline, 70° or 71° gravity; one pound gum-olibanum; half-pound cascarilla-bark; half-pound lichen. These I combine as above, and, at the present prices of the different ingredients, I produce a brilliant, non-explosive, and pleasant burning-fluid at the cost of nearly twenty-one cents per gallon, which I think is unequaled in usefulness, quality, or price by any in the market.

I have experimented with it and produced this result after much vexatious disappointments, and devoting time, labor, and expense in accomplishment of my purpose.

Having thus described my invention, what I claim as new, and desire to secure by Letters Patent, is—

The combination of the within ingredients in the manner and about the proportion described, for the purpose specified.

The above specification of my invention signed by me this 19th day of July, 1866.

JAMES P. CROSS.

Witnesses:
JAMES L. ADAMS,
J. T. DONALDSON.